No. 768,675. PATENTED AUG. 30, 1904.
F. N. McCREARY.
BAKING OVEN.
APPLICATION FILED JAN. 23, 1904.
NO MODEL.

Witnesses
F. J. Bassett
G. J. Mead

Inventor
Frederick N. McCreary
By J. C. & H. N. Snowgrove
Att'ys

No. 768,675. Patented August 30, 1904.

UNITED STATES PATENT OFFICE.

FREDERICK N. McCREARY, OF ERIE, PENNSYLVANIA.

BAKING-OVEN.

SPECIFICATION forming part of Letters Patent No. 768,675, dated August 30, 1904.

Application filed January 23, 1904. Serial No. 190,378. (No model.)

*To all whom it may concern:*

Be it known that I, FREDERICK N. MC-CREARY, a citizen of the United States, residing at Erie, in the county of Erie and State of Pennsylvania, have invented certain new and useful Improvements in Baking-Ovens; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in baking-ovens, and particularly to that class of ovens used for baking pastry products of various kinds in which it is necessary to consecutively apply intense heat to the bottom and top of the article to be baked, so as to bake the article through without either burning or unduly drying it during the process of baking it. I accomplish this result by constructing an oven with heating-chambers so arranged relative to the inside of the oven that I can apply intense heat alternately at the bottom and top of the article to be baked and regulate the degree of heat so applied thereto as desired.

The features of my invention are hereinafter fully described and pointed out, and illustrated in the accompanying drawings, in which—

Figure 1:
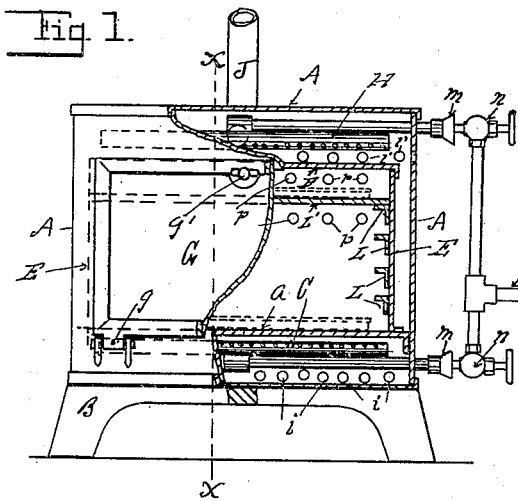
Figure 2:
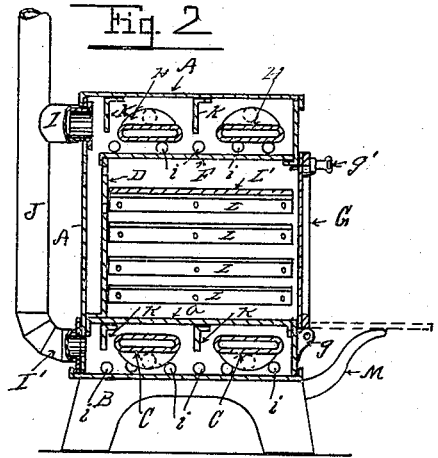
Figure 3:
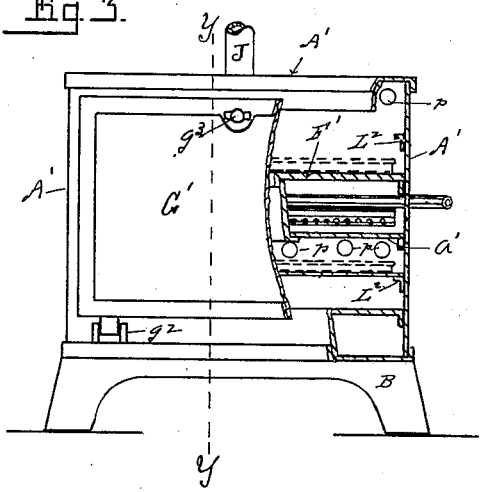
Figure 4:
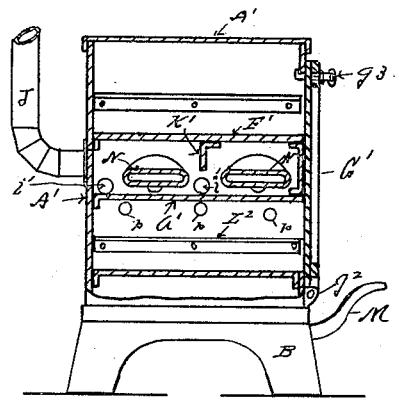

Figure 1 is a front view, partially in elevation and partially in section, of my improved oven. Fig. 2 is a cross-section of the same on the line $x$ $x$ in Fig. 1. Fig. 3 is a front view, partially in elevation and partially in section, of an alternative construction of my improved oven. Fig. 4 is a cross-section of the same on the line $y$ $y$ in Fig. 3.

In Figs. 1 and 2 of the drawings, A is the outside shell or case of the oven, the lower side of which rests upon a base B. In the lower part of this outside shell A, I construct a heating-chamber by means of a horizontal partition or floor-plate $a$, and within this lower fire-chamber I place one or more gas-burners C of usual and ordinary construction, so that the flame therefrom will flow directly against the under surface of the floor-plate $a$, so as to heat it very hot and radiate intense heat upwardly therefrom. Above the floor-plate $a$ and within the outside shell A of the oven I construct a box-like baking-chamber of smaller size than the outside shell A, so that there will be a heat-space between the ends and back of the baking-chamber and the ends and back of the outside shell, this baking-chamber being formed by the partitions or walls D E E and door G when closed. There is also a heating-chamber between the top plate F of the baking-chamber and the top plate of the outside shell A, wherein I place one or more gas-burners H, of usual and ordinary construction, but turned face downward, so that the flame therefrom will flow against the upper surface of the top plate F of the baking-chamber, so as to heat it very hot and radiate an intense heat downwardly therefrom.

Through the back of the outside shell A, leading into the lower and upper heating-chambers, I construct flues I I', which lead into a smoke-flue J for the purpose of removing from said heating-chambers the products of combustion, and through the outside shell A, I make air-holes $i$, leading into the lower part of the heating-chambers, for supplying air thereto to aid combustion. I also place in said heating-chambers baffle-plates K for the purpose of retarding the flow of the superheated air therein toward the flues I I'.

Upon the inside surface of the end walls E E of the baking-chamber I secure supports L for pan-grates, upon which may be supported the cookie-pans, as shown in dotted lines in Figs. 1 and 3, at such degree of proximity to the heated plates $a$ and F as may be necessary.

The oven-door G is secured to the body of the oven by means of ordinary hinges $g$ at its bottom edge, and by an ordinary latch $g'$ in its upper edge it is retained in position to close the open side of the baking-chamber. In Fig. 2 I show a rest M for holding the door G in a horizontal position when open. In Fig. 1 I show ordinary gas-mixers $m$ $m$, valves $n$ $n$, and connection $n'$, leading to a source of gas-supply for the burners C C and H H in the heating-chambers of the oven.

In Figs. 3 and 4 I show an alternative construction embodying my invention, utilizing but one fire-chamber and having a baking-chamber above and below it. In these two figures, A' is the oven, having an open side which is closed by means of the door G', secured to the lower part of the front of the oven-shell A' by means of hinges $g^2$ and may be retained in a closed position by the latch $g^3$. Within this shell A', I construct a heating-chamber by means of the horizontal partitions or plates $a'$ and F', and within this heating-chamber I place one or more gas-burners N of usual and ordinary construction so arranged that the flame therefrom will flow against the plates $a'$ and F' and heat them very hot, so that intense heat will be radiated upward and downward therefrom. I also secure in the upper portion of said heating-chamber a baffle-plate K'. This heating-chamber is of such size as to so divide the space inside of the shell A' that there will be commodious baking-chambers both above and below said heating-chamber. To the end walls of the baking-chambers I secure pan-grate supports $L^2$ for supporting baking-pans at such distances from the heating-chamber as may be desired. In both of the constructions herein shown I have shown gas-burners as a means of heating the oven; but I may use any other convenient means of heating the same without materially changing the construction thereof. In both constructions I provide vent-holes $p$, opening out of the baking-chambers to permit of the egress of steam and surplus heat therefrom.

In operation with the construction shown in Figs. 1 and 2 a pan of material, such as cookies, is placed upon the floor-plate $a$ of the baking-chamber and the door G closed until the contents has been subjected to the necessary amount of baking upon the bottom thereof, when the door is opened and the pan is removed from the bottom plate $a$ and placed upon a pan-grate near the under surface of the top plate F, where the upper surface of the cookies is baked until done. In the meantime a pan of fresh material has been placed upon the plate $a$, and the operation continues as long as desired.

With the construction shown in Figs. 3 and 4 the operation is somewhat reversed, the fresh material being first placed in the upper baking-chamber for the bottom bake and then in the lower baking-chamber for the top bake.

Having thus fully described my invention, so as to enable others to construct and use the same, what I claim as new, and desire to secure by Letters Patent of the United States, is—

1. The combination in a baking-oven, of a shell inclosing a baking-chamber, walls forming heating-chambers, heating appliances therein adapted to heat walls of the baking-chamber so as to radiate intense heat upward and downward therefrom into the baking-chamber, and flues for conducting the products of combustion from the heating-chambers and steam from the baking-chamber, substantially as and for the purpose set forth.

2. The combination in a baking-oven, of a shell inclosing an inner shell forming a baking-chamber with flue-spaces at the back and sides thereof, walls forming heating-chambers in said shell, gas-burners in said heating-chambers arranged to so heat the upper and lower walls of the baking-chamber, as to radiate the heat therefrom downward from the upper wall of the baking-chamber, and upward from the lower wall of the baking-chamber, substantially as set forth.

In testimony whereof I affix my signature in presence of two witnesses.

FREDERICK N. McCREARY.

Witnesses:
H. M. STURGEON,
F. J. BASSETT.